Oct. 16, 1928.
A. H. LOUCKS
1,687,622
OILING MECHANISM FOR BAND WHEEL POWER
Filed Jan. 18, 1927
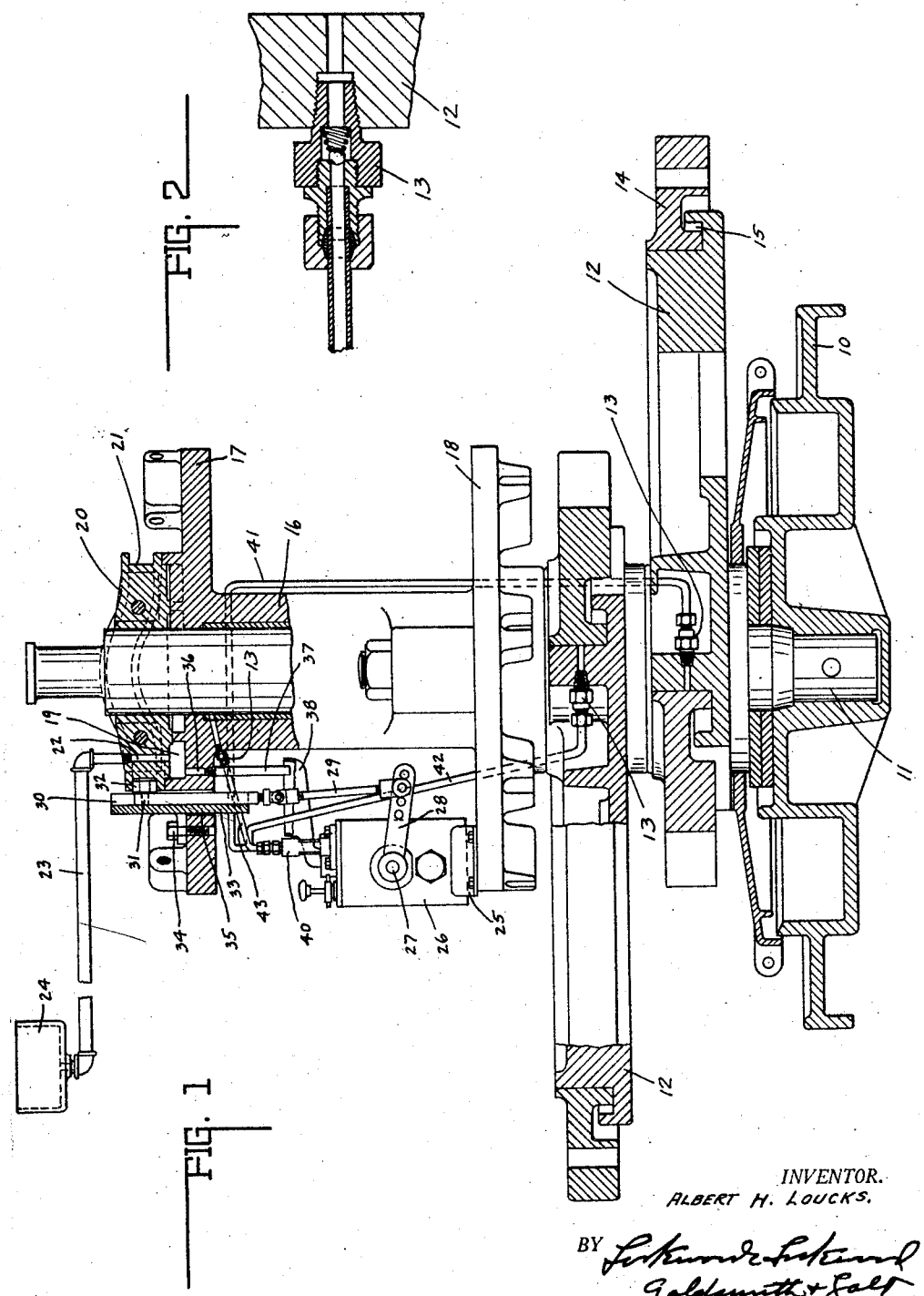
INVENTOR.
ALBERT H. LOUCKS.
BY
ATTORNEYS.

Patented Oct. 16, 1928.

1,687,622

UNITED STATES PATENT OFFICE.

ALBERT H. LOUCKS, OF MARION, INDIANA, ASSIGNOR TO MARION MACHINE, FOUNDRY & SUPPLY CO., OF MARION, INDIANA, A CORPORATION.

OILING MECHANISM FOR BAND-WHEEL POWER.

Application filed January 18, 1927. Serial No. 161,783.

This invention relates to a lubricating system for powers such as utilized in the oil fields.

The chief object of the invention is to provide means for oiling the eccentric rings operated by eccentrics of powers and secure automatic lubrication as well as replenish the lubricant supply without shutting down the power.

The chief feature of the invention consists in utilizing a force feed lubricator of suitable type and mounting the same such that it will rotate with the rotatable elements of the power and which will be automatically actuated in said rotation, whereby a predetermined adjusted amount of lubricant is supplied to the several parts to be lubricated.

Another feature of the invention consists in the arrangement of several parts of power whereby the lubricator supply can be replenished without the shutting down of the power.

The full nature of the invention will be understood from the accompanying drawings and the following description and claims:

In the drawings Fig. 1 is a central section of a multiple eccentric power and the lubricator with other parts shown mounted thereon and in elevation. Fig. 2 is an enlarged section of the nozzle.

The base casting 10 supports a vertical shaft or spindle 11 upon which is rotatably mounted in superposed relation a plurality of eccentrics 12, each having an oil nozzle 13 discharging into an underhanging, upwardly extending oiling groove 15. Mounted on each eccentric 12 is an eccentric ring 15 which has a portion extending into the underhanging groove 15 for lubrication. The eccentric rings 14 are reciprocated to and fro transversely of the shaft axis by rotation of the eccentrics. The eccentrics are suitably secured together and to a power hub 16 having the upper flange 17 and the lower flange 18, to which in turn is secured the spokes of a rim, the rim, spokes and hub construction constituting the power pulley. Thus, when the power pulley is rotated, the eccentrics will be actuated and the eccentric rings will be reciprocated.

Clampingly or otherwise secured on shaft 11, is a combination cover and cam 20 which forms a cover for a transfer well or reservoir 19, the same being annular and in the upper face of the upper hub flange 17. Cam and cover 20 includes a peripheral cam groove 21. Cam 20 is stationary and includes a port or passage 22 therethrough connected by a supply line 23 to a filling cup 24. Line 23 extends a suitable distance to clear the power pulley and thus permits the operator to approach close enough to fill the same while the power is operating. Mounted on the lower flange by means of the bracket 25 is a force feed lubricator 26 having a rockshaft 27 actuated by an arm 28. Arm 28 is connected by an adjustable mechanism or link 29 to one end of a slide 30 which pivotally supports by means of pin 31, a cam roller 32 that rides in the slot or cam groove 21. The slide 30 is slidably mounted upon a guide 33 secured as at 34 to the upper face of the upper hub flange. Said guide extends through the opening 35 formed therein so as to support the slide substantially throughout its length and its travel. Extending through the upper hub flange is a passage 36 which communicates with the transfer well 19 and a pipe 37 connects said passage 36 to a filling spout 38 of the lubricator 26.

From the foregoing, therefore, it will be understood that if lubricant is supplied to filling cup 24 the same will drain by gravity to the transfer chamber 19 irrespective of the position of the hub with respect to the cover cam. From there the lubricant will be supplied to the force feed lubricator and said arm 28 will be actuated through the slide 30 carrying the roller 32 engageable in the cam groove 21.

The lubricator is provided with a sufficient number of outlets 40, each of which supplies a valve controlled discharge line such as line 41 which supplies the nozzle 13 of the lower eccentric, line 42 which supplies the nozzle 13 of the upper eccentric and line 43 which supplies the hub bearing with lubricant. Since all of the eccentrics and the hub are associated together for rotation as a unit, the aforesaid supply distribution is satisfactory. Herein a standard lubricator is illustrated and also herein but one form of actuating mechanism is shown associated with the lubricator for automatically actuating the same in the rotation of the hub.

The invention claimed is:

1. In a lubricating system for a power including an eccentric ring, an eccentric for reciprocating the same and a power hub for rotating the eccentric, the combination of a lubricator carried by one of the aforesaid rotating parts, and means continuously associated with said lubricator for automatically actuating the same in the rotation thereof for supplying under pressure a measured quantity of lubricant to the rotating parts.

2. A device of the character defined by claim 1, with the addition of an annular transfer well communicating and rotating with the lubricator, and a stationarily mounted filling cup in communication at all times with said annular transfer well.

3. In a lubricating system for a power, the combination with a stationary vertical spindle, a hub rotatable thereon carrying a radial flange at its upper end, and an eccentric below said flange, and an eccentric ring mounted on said eccentric, of an oil reservoir in said flange concentric with said spindle, a cam secured on the spindle above the said flange and reservoir, force feeding means carried by the hub and revoluble about said spindle and adapted to receive by gravity oil from said reservoir, means actuated by the cam as said parts revolve about the spindle for actuating said force feeding means, and means for conveying the lubricant from said force feeding means to various parts of the device, substantially as set forth.

4. A lubricating system substantially as set forth in claim 3, said reservoir in the flange of the mechanism being annular with communication therefrom to the force feeding means so as to supply lubricant to the force feeding means at all times, and stationary means mounted in connection with said cam for constantly discharging into said reservoir.

In witness whereof, I have hereunto affixed my signature.

ALBERT H. LOUCKS.